United States Patent
Berger et al.

(10) Patent No.: US 11,147,237 B2
(45) Date of Patent: Oct. 19, 2021

(54) PET BED AND STEP SYSTEM

(71) Applicants: Dean Berger, Tarpon Springs, FL (US); Rosa Varela, Holiday, FL (US)

(72) Inventors: Dean Berger, Tarpon Springs, FL (US); Rosa Varela, Holiday, FL (US)

(*) Notice: Subject to any disclaimer, the term of this patent is extended or adjusted under 35 U.S.C. 154(b) by 222 days.

(21) Appl. No.: 16/570,870

(22) Filed: Sep. 13, 2019

(65) Prior Publication Data
US 2021/0076636 A1 Mar. 18, 2021

(51) Int. Cl.
*A01K 1/035* (2006.01)
*E04F 11/02* (2006.01)

(52) U.S. Cl.
CPC ............ *A01K 1/0353* (2013.01); *E04F 11/02* (2013.01)

(58) Field of Classification Search
CPC .... A01K 1/0353; A01K 1/0157; A01K 1/015; A01K 1/035
See application file for complete search history.

(56) References Cited

U.S. PATENT DOCUMENTS

| | | |
|---|---|---|
| 2,032,248 A | 2/1936 | Bins |
| 3,173,398 A | 3/1965 | Raymond |
| 3,989,008 A | 11/1976 | Neumann |
| 5,144,911 A | 9/1992 | Moore et al. |
| 5,765,502 A | 6/1998 | Haugh |
| D397,740 S | 9/1998 | Georgevich |
| 6,155,207 A | 12/2000 | LaRocca |
| 6,964,246 B2 | 11/2005 | Wolfington et al. |
| D531,364 S | 10/2006 | Crane |
| D534,692 S | 1/2007 | Northrop |
| 7,373,900 B2 | 5/2008 | Duncan |
| D638,173 S | 5/2011 | Elmburg et al. |
| D640,015 S | 6/2011 | Birck |
| D685,531 S | 7/2013 | Wozniak |
| D725,832 S | 3/2015 | Coulter |
| 10,888,168 B2 * | 1/2021 | Caulk ................. A01K 1/035 |
| 2002/0117119 A1 | 8/2002 | Brown |
| 2002/0121243 A1 | 9/2002 | Martyn |

(Continued)

FOREIGN PATENT DOCUMENTS

GB 2474283 A 4/2011

OTHER PUBLICATIONS

"Elevated Dog Bed with stairs"; printed on Jul. 24, 2019 from https://www.etsy.com/listing/287043787/elevated-dog-bed-with-stairs?gpla=1&gao=1&utm_campaign=shopping_us_THHCreations_sfc_osa&utm_medium=cpc&utm_source=google&utm_custom1=0&utm_content=7309271&gclid=EAlalQobChMl8rnhibK82AlVkFmCh03BQuIEAkYDCABEglzt_D_BwE.

*Primary Examiner* — Trinh T Nguyen
(74) *Attorney, Agent, or Firm* — Nath, Goldberg & Meyer; Richard C. Litman

(57) ABSTRACT

The pet bed and step system has multiple components that may be used separately or in combination to provide a raised pet bed having steps or stairs leading to the pet bed. The pet bed and step system includes a foldable base that may be used by itself as a pet bed, or with the rear portion folded up to form a two-step assembly. A step assembly may be mounted on the base and releasably secured thereto by releasable fasteners, such as a zipper, hook-and-loop, or snap fasteners. The step assembly includes at least one intermediate step and a top step, the top step being configured as a luxury pet bed, having a U-shaped bolster around a portion of its periphery and a cushioned pad removably attached to its top surface.

16 Claims, 5 Drawing Sheets

(56) References Cited

U.S. PATENT DOCUMENTS

| | | |
|---|---|---|
| 2002/0185072 A1 | 12/2002 | Walpin |
| 2003/0154569 A1 | 8/2003 | Vandaan |
| 2004/0194713 A1 | 10/2004 | Dalal et al. |
| 2004/0244724 A1 | 12/2004 | Runge |
| 2013/0111663 A1* | 5/2013 | Brown .................. A47C 21/00 |
| | | 5/507.1 |
| 2015/0250135 A1 | 9/2015 | Simon |
| 2019/0141945 A1* | 5/2019 | Begin .................... A01K 1/035 |
| | | 119/165 |

* cited by examiner

PET BED AND STEP SYSTEM

BACKGROUND

1. Field

The disclosure of the present patent application relates to pet care accessories, and particularly to a pet bed and step system that may be configured with a raised pet bed on the top step or stair.

2. Description of the Related Art

Many pets prefer to relax and sleep on surfaces that are raised above the floor. Cats, for example, can often be found sleeping on household furniture, such as couches, chairs and their owners' beds. Due to the occasional inconvenience of having a pet sleeping on household furniture, pet beds provide a comfortable and secure place for pets to sleep and rest. However, most pet beds are designed to simply rest on the floor, leaving the pet's desire for height unfulfilled.

Although some pet beds could be placed on a table, for example, a pet's ability to climb and jump to a desired level often diminishes with age. Although small sets of stairs are available to assist pets in climbing onto raised surfaces, such as couches and human beds, such stairs are not dimensioned or configured to assist a pet with climbing to a pet bed that has been raised up on a table or the like. Thus, a pet bed with stairs solving the aforementioned problems is desired.

SUMMARY

The pet bed and step system has multiple components that may be used separately or in combination to provide a raised pet bed having steps or stairs leading to the pet bed. The pet bed and step system includes a foldable base that may be used by itself as a pet bed, or with the rear portion folded up to form a two-step assembly. A step assembly may be mounted on the base and releasably secured thereto by releasable fasteners, such as a zipper, hook-and-loop, or snap fasteners. The step assembly includes at least one intermediate step and a top step, the top step being configured as a luxury pet bed, having a U-shaped bolster around a portion of its periphery and a cushioned pad removably attached to its top surface. The components of the system may be made of polyurethane foam, except that the base may have a top layer of viscoelastic memory foam, and the removable pad attached to the top step may also be viscoelastic memory foam.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
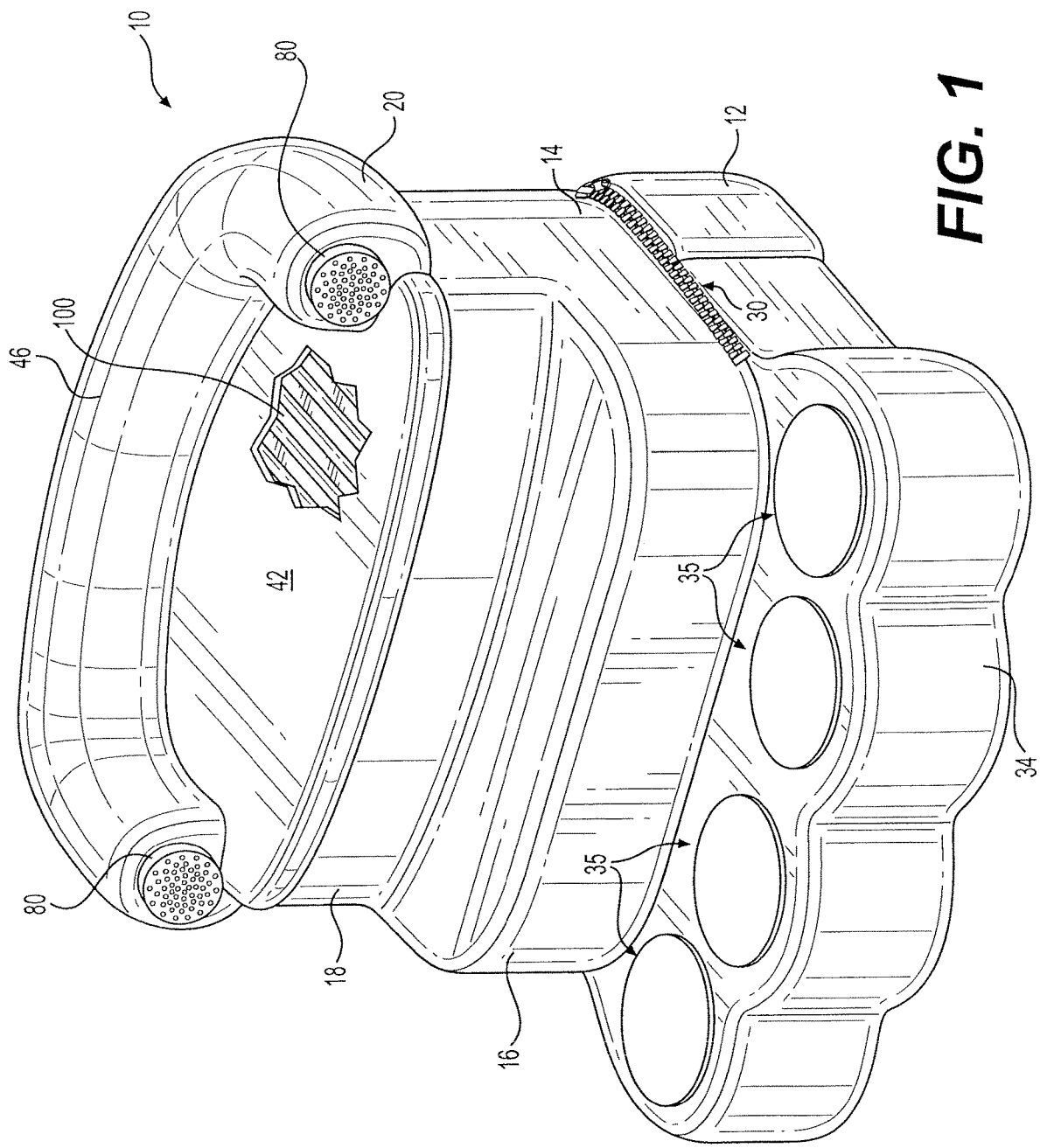
FIG. 1 is a perspective view of a pet bed and step system.
Figure 2:
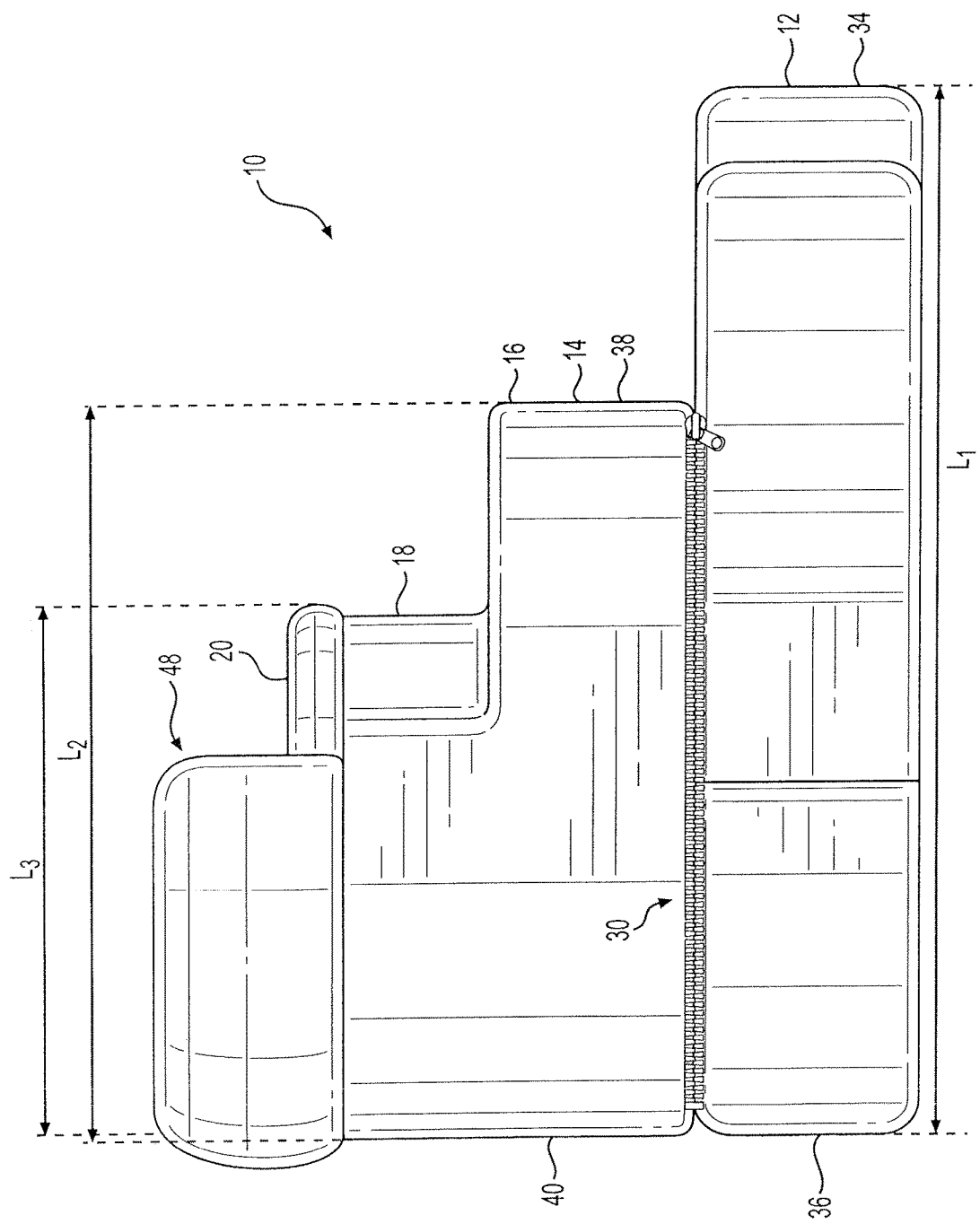
FIG. 2 is side view of the pet bed of FIG. 1.
Figure 3:
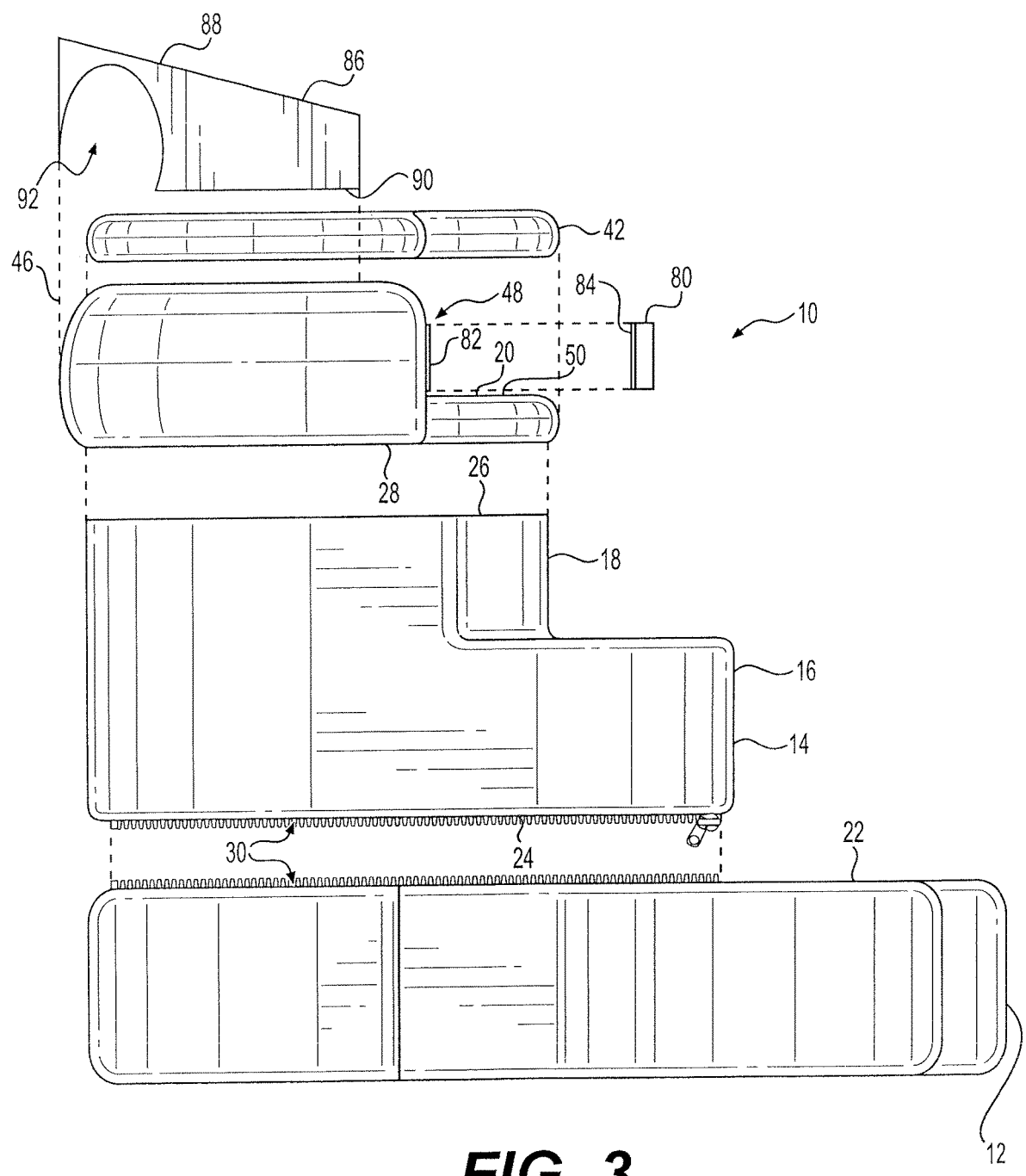
FIG. 3 is an exploded side view of the pet bed of FIG. 1.
Figure 4A:
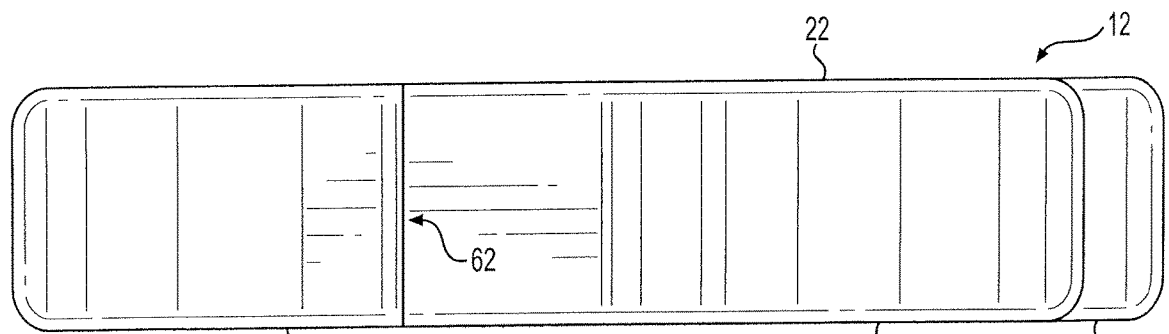
FIG. 4A is a side view of the base of the pet bed of FIG. 1, shown in an unfolded state.
Figure 4B:
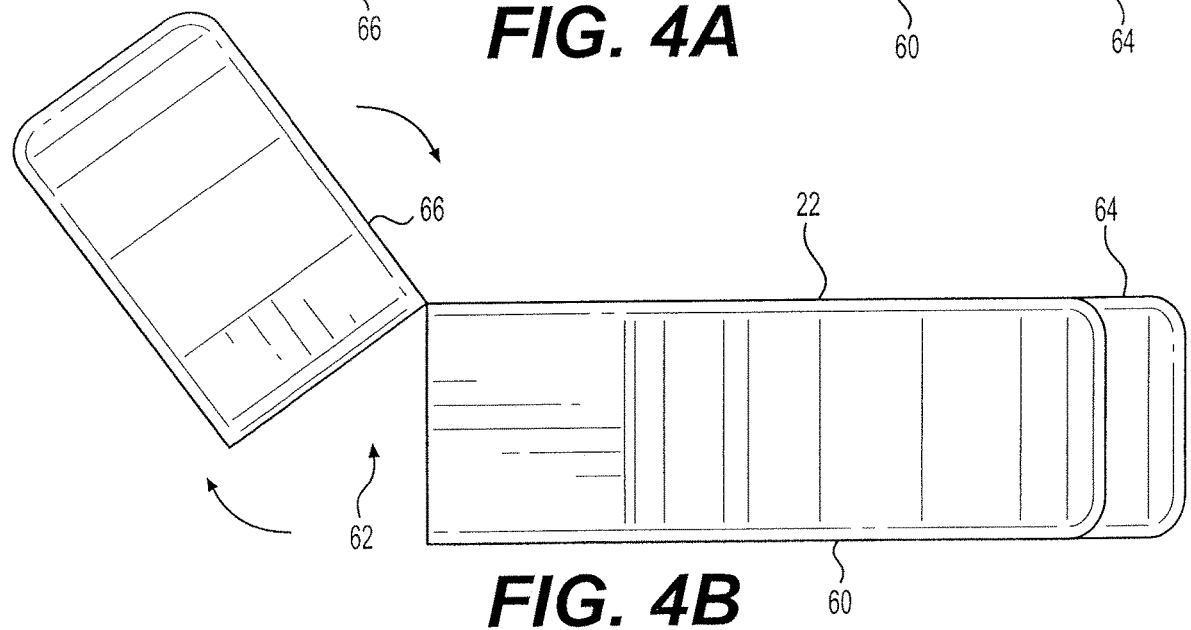
FIG. 4B is a side view of the base of FIG. 4A, shown in an intermediate state.
Figure 4C:
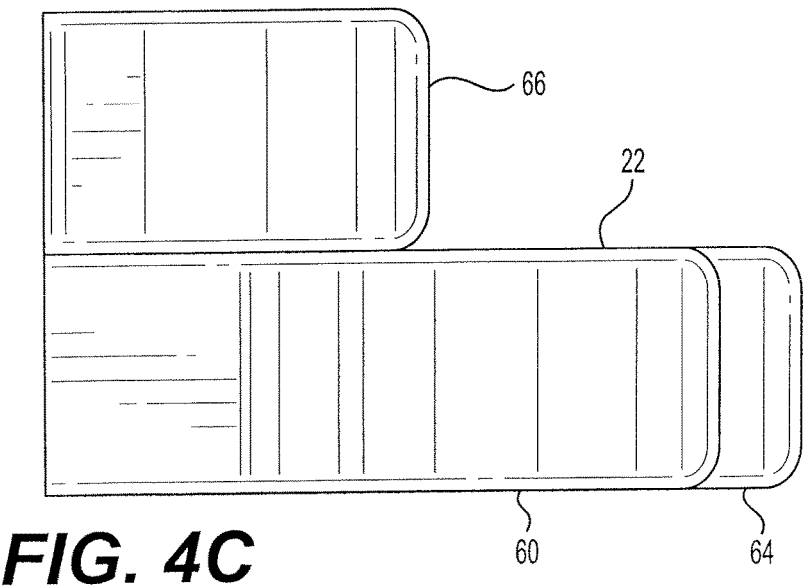
FIG. 4C is a side view of the base of FIG. 4A, shown in a folded state.
Figure 5:
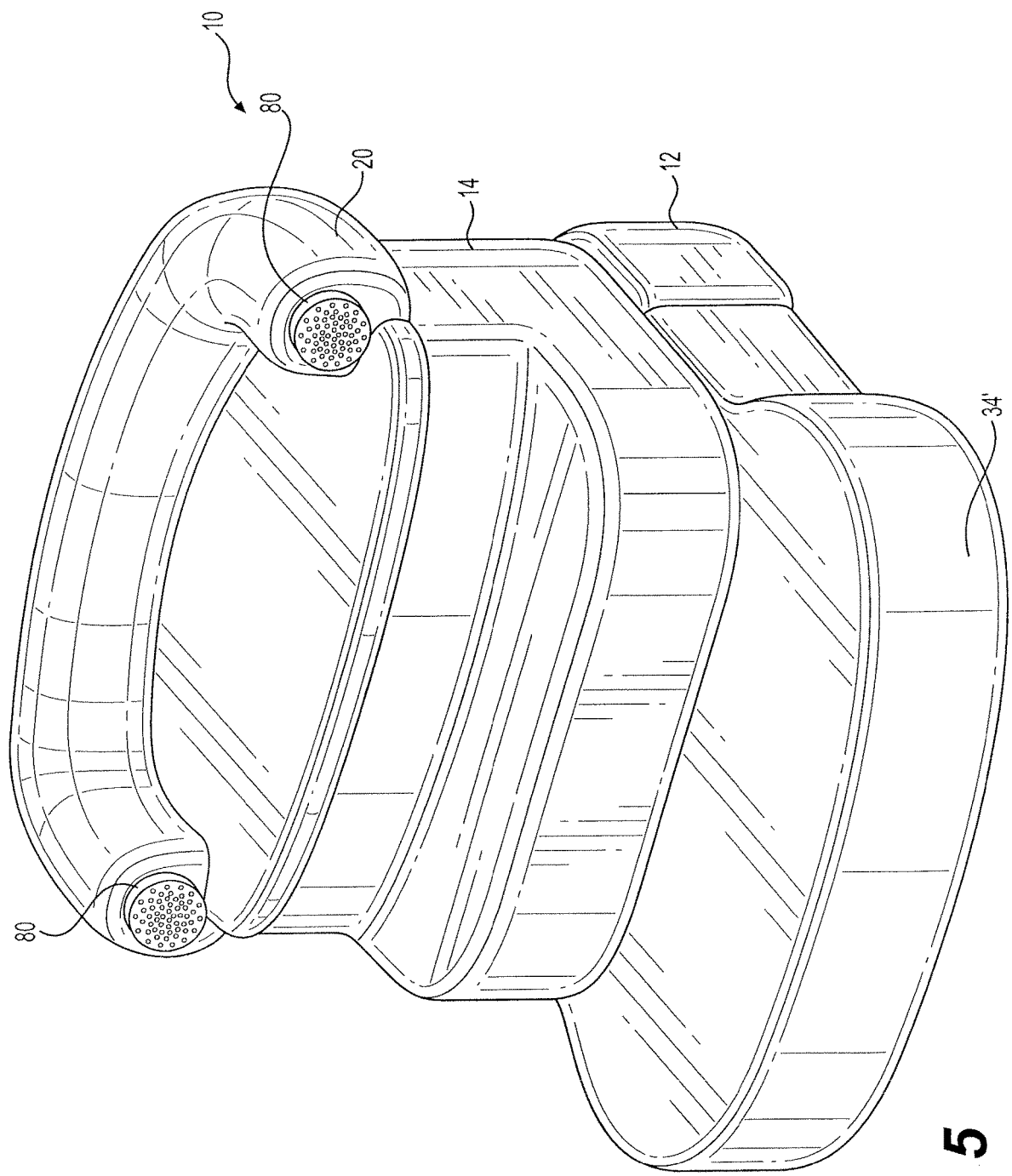
FIG. 5 is a perspective view of an alternative embodiment of the pet bed and step system.

The pet bed and step system 10 may be configured as a raised pet bed having steps or stairs leading to the pet bed. As shown in FIGS. 1-3, the system 10 includes a base 12 made of polyurethane foam, the top surface 22 of the base 12 having a layer of viscoelastic memory foam. The front wall 34 of the base 12 may be undulating and the top surface 22 may have decorative patches simulating paw pads so that the base 12 simulates a pet's paw. Alternatively, the front wall 34' of the base 12 may have a simple, arcuate contour, if desired, as shown in FIG. 5. The base 12 may be used as a standalone component for a floor-level pet bed or as a mat. As shown in FIGS. 4A-4C, the base 12 may include a front portion 64 and a rear portion 66, which may be separated from one another by a slit 62, extending from the lower surface 60 of the base 12 to almost the top surface 22. At least a strip or layer of the top surface 22 remains intact above the slit 62. This connection allows the rear portion 66 to be pivotally joined to the front portion 64 at the top surface 22. As shown in FIGS. 4B and 4C, the rear portion 66 can be pivoted with respect to the front portion 64 and folded forward to lay on the top surface, defining a two-step for the pet to use, if desired, the base 12 defining a bottom step and the folded rear portion 66 defining a second step elevated above the base 12.

The system 10 also includes a step assembly 14 that may be used as a standalone component, or that may be mounted on top of the base 12 and secured thereto by zipper 30 having mating fastener components attached to the base 12 and the step assembly 14, or other releasable fastener(s), such as hook-and-loop fasteners, snap fasteners, or other releasable fastener(s) attaching the bottom surface 24 of the step assembly 14 to the top surface 22 of the base 12. The step assembly 14 may include at least one intermediate step 16 or stair and a top step 18 or stair. As shown in FIG. 2, the base 12 has a length $L_1$ extending from the front wall 34 to the rear wall 36 of the base 12 that is longer than the length $L_2$ of the intermediate step 16 (which extends from the front wall 38 to the rear wall 40 of the step 16), which, in turn, is longer than the length $L_3$ of the top step 18. The pet may climb onto the front portion 64 of the base 12, which defines the bottom step, onto the at least one intermediate step 16, and then onto the top step 18 of the staircase configuration of the system 10 shown in FIG. 2.

As shown in FIGS. 1 and 5, the system 10 includes a luxury pet bed 20 disposed on the top step 18. The pet bed 20 may be integral with the top surface 26 of the top step 18 or, as shown in FIG. 3, the pet bed 20 may be removably supported by the top step 18, e.g., having a floor 50 having a bottom surface 28 supported on the top surface 26 of the top step 18. The pet bed 20 may include a semi-ovoid bolster 46 made of polyurethane foam extending partially around the periphery of the top step 18, leaving an open front 48 facing the staircase configuration of steps 12, 16, 18. The bolster is generally cylindrical throughout its length, but may have a flat bottom surface for attachment to the floor 50 of the pet bed 20. A cushion 42 of viscoelastic memory foam may be disposed on the floor 50 of the pet bed 20 to provide a comfortable surface for the pet to sleep upon.

It should be understood that the overall dimensions and configuration of the pet bed and step system 10 are shown for exemplary and illustrative purposes only. Further, in the embodiment of FIGS. 1-3, the step assembly 14 is shown as having two steps 16, 18. However, it should be understood that the step assembly 14 may include any desired number of steps.

When the base 12 and the step assembly 14 are attached to one another, as shown in FIG. 2, the rear end 36 of the base 12 may be vertically aligned with a rear end 40 of the step assembly 14. Because the length $L_2$ of the intermediate step 16 is less than the length $L_1$ of the base 12, the intermediate step 16 defines at least one step up to the pet bed 20 from the base 12, the top step 18 defining another step up from the base 12.

In an alternative embodiment, the bolster 46 may be at least partially detachable and/or foldable, allowing at least a portion of the bolster 46 to be laid within the open inner region of pet bed 20 to act as additional padding or an additional step. As shown in FIG. 1, an optional heating and/or massage pad 100 may be embedded within the cushion or pad 42. It should be understood that any suitable type of heating and/or massage pad may be used, and may be powered by any suitable supply of energy, such as with a conventional outlet plug and cord, a USB port, rechargeable batteries or the like.

As shown in FIGS. 1 and 3, one or more speakers 80 may be mounted on the pet bed 20. It should be understood that the one or more speakers 80 are absent from FIG. 2 for purposes of illustration and clarity only. It should be further understood that the speakers 80 are shown for exemplary purposes only, and may have any desired configuration or overall appearance. Additionally, it should be understood that the speakers 80 may be any suitable type of speakers, such as conventional wireless speakers. For example, the speakers 80 may be Bluetooth® enabled speakers. Further, as best seen in FIG. 3, the speakers 80 may be releasably attached to the pet bed 20. In FIG. 3, the speakers 80 are shown releasably attached to the pet bed 20 by hook and loop fasteners 82, 84 attaching the speakers 80 to opposing ends of the bolster 46, although it should be understood that any suitable form of attachment, such as snaps, clips or the like, may be used.

Further, as shown in FIG. 3, an additional step 86 may be removably disposed on the pet bed 20. The additional step 86 is dimensioned and configured to easily fit within the pet bed 20 and rest either on cushion or pad 42 or on the floor 50. The additional step 86 has opposed top and bottom surfaces 88, 90, respectively. As shown, the top surface 88 may be angled to form a ramp. Thus, in use, a pet may easily use the ramped surface 88 of the additional step 86 to reach a high location, such as a bed. As shown, the bottom surface 90 may have a recess or cut-out 92, allowing the additional step 86 to hook over the bolster 46. It should, however, be understood that the additional step 86 may have any suitable dimensions and configuration. The foam components may be encased or enclosed in fabric covers that may be removed for cleaning as needed, as known in the furniture and pet accessory art. For example, the bolster 46 may be removably received within its cover and held therein by a zipper or the like.

It is to be understood that the pet bed and step system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A pet bed and step system, comprising:
   a base having a front portion;
   a step assembly removably mounted on the base, the step assembly having at least one intermediate step and a top step, the step assembly leaving the front portion of the base exposed to define a bottom step when the step assembly is mounted on the base, the top step defining a periphery;
   a cushioned pad disposed on the top step; and
   a bolster extending around a portion of the periphery of the top step, the cushioned pad and the bolster defining a pet bed on the top step, wherein the bottom step, the at least one intermediate step, and the top step define a staircase configuration leading up to the pet bed on the top step.

2. The pet bed and step system as recited in claim 1, wherein said base further comprises:
   a top layer made of viscoelastic memory foam; and
   a rear portion foldable to lie on top of the base, defining an optional step;
   whereby said base is optionally usable as a standalone pet bed and step system without said step assembly.

3. The pet bed and step system as recited in claim 1, wherein said step assembly, said cushioned pad, and said bolster are usable as a standalone pet bed and step system without said base.

4. The pet bed and step system as recited in claim 1, further comprising mating releasable fasteners attached to said base and said step assembly for releasably securing said step assembly to said base.

5. The pet bed and step system as recited in claim 4, wherein said mating releasable fastener components comprise mating zipper fasteners.

6. The pet bed and step system as recited in claim 1, wherein said base and said step assembly each comprise a rear end, the rear end of said step assembly being vertically aligned with the rear end of said base when said step assembly is mounted on said base and secured thereto.

7. The pet bed and step system as recited in claim 1, said base, said step assembly, and said bolster are each made of polyurethane foam.

8. The pet bed and step system as recited in claim 1, wherein said cushioned pad is made of viscoelastic memory foam.

9. The pet bed and step system as recited in claim 1, wherein said pet bed further comprises a bottom disposed on said top stair, said cushioned pad being removably attached to the bottom of said pet bed.

10. The pet bed and step system as recited in claim 1, wherein said base has an undulating front wall and decorative patches mounted above the front wall, said base simulating a pet's paw.

11. The pet bed and step system as recited in claim 1, wherein said pet bed is removably supported by said top step.

12. The pet bed and step system as recited in claim 1, wherein said bolster is substantially cylindrical and has a flat bottom surface, said bolster being semi-ovoid and open to the staircase configuration of steps.

13. The pet bed and step system as recited in claim 12, further comprising a ramped step having an arched bottom surface dimensioned and configured for hooking over said bolster and a sloping top surface defining a ramp for climbing over sad pet bed.

14. The pet bed and step system as recited in claim 12, further comprising at least one speaker removably attached to said pet bed.

15. The pet bed and step system as recited in claim 12, wherein said bolster is elongated and has opposing ends, the at least one speaker being a wireless speaker removably mounted in one of the ends of said bolster.

16. The pet bed and step system as recited in claim 1, further comprising a heating element disposed in said cushioned pad.

* * * * *